United States Patent

Harris

[15] 3,636,540
[45] Jan. 18, 1972

[54] TEMPERATURE CONTROL ALARM SYSTEM

[72] Inventor: Holton E. Harris, Westport, Conn.
[73] Assignee: Harrel Incorporated, East Norwalk, Conn.
[22] Filed: Nov. 29, 1968
[21] Appl. No.: 779,768

[52] U.S. Cl. .................................340/228, 328/3, 340/233
[51] Int. Cl. .................................G01k 7/24, G01k 7/16
[58] Field of Search ............340/227, 228, 233, 213, 248 A, 340/248 B, 248 C; 328/3; 317/40, 42

[56] References Cited

UNITED STATES PATENTS

| | | | |
|---|---|---|---|
| 3,191,068 | 6/1965 | Robb, Jr. ..........................340/233 X |
| 3,304,441 | 2/1967 | Pelt...................................340/233 X |
| 3,404,313 | 10/1968 | Happel et al......................317/40 X |
| 3,452,656 | 7/1969 | Ruhle et al........................340/233 X |
| 3,494,196 | 2/1970 | Moussette.........................340/233 X |
| 2,742,634 | 4/1956 | Bergen et al.....................340/233 X |
| 3,188,553 | 6/1965 | Evrenius..........................340/233 X |
| 3,268,881 | 8/1966 | Vasel................................340/228 X |
| 3,476,944 | 11/1969 | Odone..............................340/228 X |
| 3,527,987 | 9/1970 | Havlicek..........................340/248 C X |

Primary Examiner—John W. Caldwell
Assistant Examiner—Scott F. Partridge
Attorney—Brumbaugh, Graves, Donohue & Raymond

[57] ABSTRACT

As described herein, a temperature alarm control system is provided which includes a plurality of temperature measuring devices which generate positive or negative signals in accordance with an increase or decrease in temperature in a corresponding number of furnaces to which the devices are operatively connected. The signals are amplified and thereafter, of the signals developed by the measuring devices, only the positive and negative signals having the greatest magnitudes are supplied to an alarm circuit to excite a pair of alarms.

7 Claims, 1 Drawing Figure

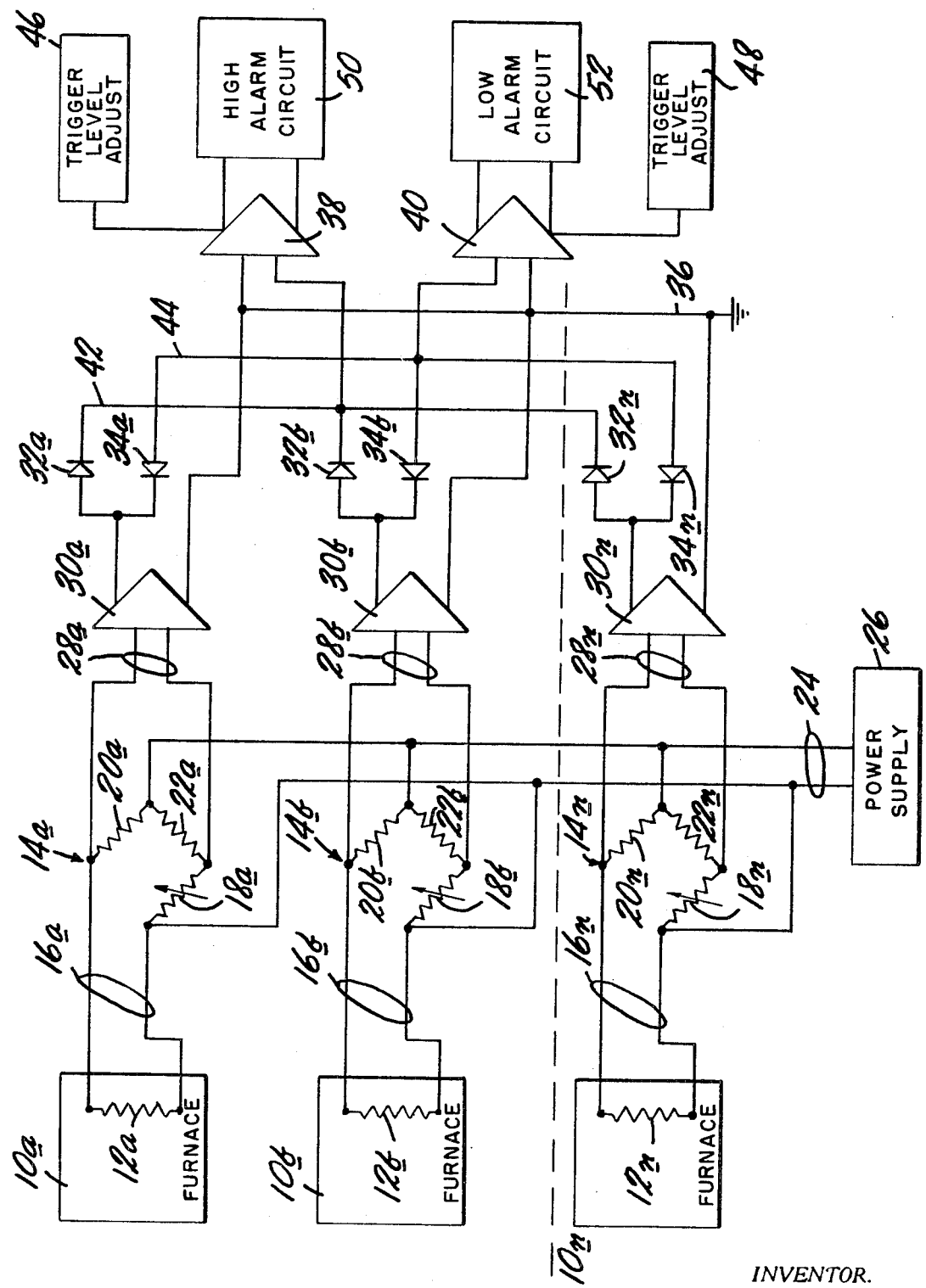

TEMPERATURE CONTROL ALARM SYSTEM

BACKGROUND OF THE INVENTION

This invention relates to alarm systems and, more particularly, to temperature control alarm systems which provide alarm indications when the actual temperature in a particular environment, such as a furnace, deviates from a predetermined temperature.

In presently devised temperature control systems which provide highly precise measurements of temperature, instead of measuring an input signal which corresponds to the actual temperature in a furnace or the like directly on a meter or a similar device, an opposing signal is generated. The magnitude of this opposing signal is increased or decreased, as the case may be, until its magnitude corresponds to the magnitude of the input signal to cancel the input signal and achieve a null or balanced condition. The magnitude of the opposing signal is determinative of the temperature in the furnace or the like.

In alarm systems embodying the above-described control systems, alarms are coupled to the control systems and are actuated whenever the magnitude of the opposing signal is above or below certain selected levels. This indicates that the deviation of actual temperature from desired temperature has reached a certain value which requires instant attention. Heretofore in such systems, an alarm has been associated with each of the temperature control systems. This gives rise to a rather complex overall alarm system in that each of the alarms requires presetting to meet the exigencies of the particular environment within which its associated temperature control system is situated.

SUMMARY OF THE INVENTION

Accordingly, it is an object of the present invention to provide a temperature control alarm system wherein the temperatures in a plurality of locations can be effectively monitored and a single alarm actuated when any one of the systems generates a signal to indicate that the deviation between the actual temperature and the desired temperature in one of the locations has reached a critical value.

This and other objects are accomplished by the temperature control alarm system of the present invention which comprises a plurality of temperature-measuring devices for generating positive or negative signals in accordance with an increase or decrease in temperature in a corresponding number of selected locations to which the devices are operatively connected. Also provided are a corresponding plurality of unidirectional current conducting devices responsive to the signals generated by the measuring devices and having common output terminals connected together and to the input terminals of a pair of alarm circuits. By connecting the output terminals of the unidirectional current conducting devices together, only the positive and negative signals having the greatest magnitudes are supplied to the alarm circuits to excite the alarms.

In the preferred embodiment of the invention, each temperature-measuring device comprises a wheatstone bridge having one leg thereof comprising a temperature-sensitive device situated in a heat-generating plant and having a second leg which includes a variable impedance. The variable impedance is set to a value which relates to the value of the temperature-sensitive device such that a balanced condition in the bridge is reached when the temperature-sensitive device has a value which reflects a desired temperature in the heat-generating plant. When the temperature in the plant rises or falls above or below the desired temperature, an imbalance is created and the bridge developes a positive or negative signal. This signal, which may be amplified, is supplied from the bridge to a pair of diodes connected in parallel and forward biased and reverse biased, respectively. The diodes will conduct either of the signals provided signals having greater magnitudes are not conducted by the diodes associated with any of the other temperature-measuring devices.

BRIEF DESCRIPTION OF THE DRAWING

In the Drawing:
FIG. 1 is a schematic block diagram of a typical temperature control alarm system arranged according to the present invention.

DESCRIPTION OF THE PREFERRED EMBODIMENT

In a typical temperature control alarm system arranged according to the present invention, as shown in FIG. 1, the temperatures in a plurality of furnaces 10a–10n are measured and an alarm sounded when the temperature in any one of the furnaces exceeds or falls below a predetermined desired temperature. Mounted in the furnaces 10a–10n are temperature-sensitive devices 12a–12n, which may, for example, be platinum resistance thermometers and which comprise the first legs of a corresponding plurality of wheatstone bridges 14a–14. A plurality of conductors 16a–16n couple the temperature-sensitive devices 12a–12n, respectively, to the bridges 14a–14n.

The second legs 18a–18n of the wheatstone bridges 14a–14 comprise rheostats which may be adjusted to create a null or balanced condition in the bridges 14a–14n. Specifically, the remaining legs 20a–20n and 22a–22n of the wheatstone bridges comprise resistors having fixed resistances. As is understood in the art, in order to achieve a balanced condition in the wheatstone bridges 14a–14n, it is necessary that the ratio between the resistance values of the temperature-sensitive devices 12a–12n and the rheostats 18a–18n equal the ratio between the values of the resistances 20a–20n and 22a–20. The necessary relationship is given below:

$$\frac{R12a - 12n}{R18a - 18n} = \frac{R20a - 20n}{R22a - 22n}$$

Coupled to the input terminals of the wheatstone bridges 14a–14 via a pair of conductors 24 is a power supply 26 which supplies a constant DC voltage to the bridges. The output terminals of the bridges 14a–14n are connected via conductors 28a–28n to the input terminals of a corresponding plurality of amplifiers 30a–30n.

As above-mentioned, the rheostats 18a–18n are adjusted such that a null condition or balanced condition is reached in the bridges 14a–14n when the temperatures within the furnaces 10a–10n are within selected and preferred ranges. Obviously, the desired temperature or temperature range for each of the furnaces 10a–10n may be the same or may be different. When the temperatures in the furnaces 10a–10n increase above the desired degrees of hotness, imbalances are created and the bridges 14a–14n develop positive DC voltage signals. This is true inasmuch as the resistance values of the devices 12a–12 increase as the temperatures in the furnaces 10a–10n increase. Conversely, as the temperatures within the furnaces 10a–10 decrease, the resistance values of the devices 12a–12 decrease and the bridges 14a–14n develop negative DC signals and supply these signals to the amplifiers 30a–30n.

The signal carrying output terminals of the amplifiers 30a–30 are connected to a corresponding number of forward biased diodes 32a–32n and reverse biased diodes 34a–34n, respectively, connected in parallel. The common output terminals of the amplifiers 30a–30n are connected together via a conductor 36 and to the input terminals of a pair of amplifiers 38 and 40. The cathodes of the forward biased diodes 32a–32 are connected together via a conductor 42 and connected to the other input terminal of the amplifier 38. A conductor 44 connects the anodes of the reverse biased diodes 34a–34 together and to the other input terminal of the amplifier 40. The diodes 32a–32n and 34a–34n, which may be, for example, silicon diodes, conduct when the voltage levels thereacross exceed, for example, three-quarters of a volt.

As is understood, of the diodes 32a–32n and 34a–34n, only one forward biased diode and one reverse biased diode will conduct at a time because the diode conducting the highest current signal will back-bias the diodes to which it is connected. For example, should the diode 32a conduct the highest positive current signal, that signal will back-bias the diodes 32b–32n and render them nonconductive. Similarly, if the diode 34b were to conduct the highest negative current signal, that signal would back-bias the remaining diodes 34a, 34c–34 and render them nonconductive. It will be noted that one of the diodes 32a–32n will be rendered conductive when there is a predetermined increase in temperature in one or more of the furnaces 10a–10n and one of the diodes 34a–34n will be rendered conductive when there is a predetermined decrease in temperature in one or more of the furnaces 10a–10.

Coupled to the amplifier 38 is a trigger level adjust circuit 46 which adjusts the triggering input level of the amplifier. Similarly, a trigger level adjust circuit 48 is coupled to the amplifier 40 for adjusting the triggering input level of the amplifier. The adjust circuits 46 and 48 are provided to control the amount of temperature variation which will set an alarm. Specifically, any one of the diodes 32a–32n or 34a–34n may conduct, for example when the deviation voltage developed by one of the bridges 14a–14n represent a 2° variation in one of the furnaces from the desired temperature. If it is not desired to set the alarm for a 2° variation but rather a 16° variation, the adjust circuits 46 and 48 are adjusted to set the amplifiers 38 and 40 to respond to signals having magnitudes which correspond to a 16° deviation in temperature.

The output terminals of the amplifier 38 are connected to a high alarm circuit 50 which for example, may be a solenoid-actuated bell, and accordingly, produces a loud ringing noise whenever the temperature in one of the furnaces exceeds a fixed or desired degree of hotness by a predetermined amount. A low alarm circuit 52 is coupled to the output terminals of the amplifier 52 and provides a ringing noise of different pitch or loudness level whenever the temperature in one of the furnaces 10a–10n falls below a desired degree of hotness.

In operation, the rheostats 18a–18n of the wheatstone bridges 14a–14n are adjusted such that a balanced condition exists when a desired temperature is realized in the furnaces 10a–10, as reflected by the resistance values of the temperature-sensitive devices 12a–12n located in the furnaces. With balanced conditions, no signal is supplied from the wheatstone bridges 14a–14n to the amplifiers 30a–30n. As soon as the temperature in any one of the furnaces 10a–10n increases or decreases to bring about an imbalance in its corresponding wheatstone bridge, the corresponding amplifier will supply either a positive or negative output signal. For example, if the temperature in the furnace 10b were to increase above a predetermined degree of hotness, the amplifier 30b would supply a positive signal through the diode 32b to the input terminal of the amplifier 38. Depending upon the setting of the trigger level adjust circuit 46, the amplifier 38 would then set the high alarm circuit 50 and an alarm would be sounded. If at the same time, the temperature in the furnace 12n were to decrease below a desired degree of hotness, the wheatstone bridge 14n would become unbalanced and the amplifier 30n would supply a negative signal through the diode 34n to the amplifier 40. The amplifier 40, depending upon the setting of the trigger level adjust circuit 48, would then activate the low alarm circuit 52 and a second alarm would be sounded.

If the temperatures in all the furnaces 12a–12n were to increase above desired degrees of hotness, all the amplifiers 30a–30 would generate positive signals. However, only the signal having the greatest magnitude would be conducted so that only it would implement the setting of an alarm, the remaining diodes being rendered nonconductive. Similarly, if the temperatures in the furnaces 10a–10n were to decrease below desired degrees of hotness, the amplifiers 30a–30n would conduct, but only the negative signal having the greatest magnitude would be passed by one of the diodes 34a–34 to the input terminal of the amplifier 40 to set the low alarm circuit 52.

Although the invention has been described herein with reference to a specific embodiment, many modifications and variations therein will readily occur to those skilled in the art. For example, instead of employing a wheatstone bridge as the temperature-measuring device, thermocouples could be employed. In this instance, the input voltage signals corresponding to the temperatures in the furnaces, would be summed with locally generated signals from precision voltage dividers. Accordingly, all such modifications and variations are included within the intended scope of the invention as defined by the following claims.

I claim:

1. A temperature control alarm system comprising a plurality of temperature-measuring devices responsive to temperature deviations about a nominal temperature in a corresponding plurality of locations for generating positive and negative signals having amplitudes corresponding to the extents of said deviations, means responsive to the positive and negative signals generated by the plurality of temperature-measuring devices for conducting the positive and negative signals having the greatest magnitudes, an alarm means selectively responsive to the conducted positive and negative signals for providing indications that temperature deviations have occurred in at least one location and alarm level control means operatively coupled to the alarm means for controlling the levels at which the alarm means, in response to the conducted positive and negative signals, provides indications that temperature deviations deviating from the nominal temperature by a selected amount have occurred in at least one location.

2. A temperature control alarm system according to claim 1 further comprising amplifier means responsive to the positive and negative signals generated by the plurality of temperature-measuring devices for amplifying said signals and supplying said signals to the conducting means.

3. A temperature control alarm system according to claim 1 wherein the plurality of temperature-measuring devices comprise a plurality of wheatstone bridges, each bridge comprising at least one leg thereof including a temperature-sensitive device located in a particular location and a second leg thereof including means for providing a variable impedance to balance the bridge when the temperature-sensitive device has a predetermined impedance.

4. A temperature control alarm system according to claim 1 wherein the alarm means comprises a high alarm circuit responsive to a conducted positive signal for providing an indication that a positive deviation in temperature has occurred in at least one location and a low alarm circuit responsive to a conducted negative signal for providing an indication that a negative deviation in temperature has occurred in at least one location.

5. A temperature control alarm system according to claim 4 wherein the conducting means comprises a plurality of diode circuits operatively coupled to the plurality of temperature-measuring devices, each diode circuit comprising a pair of diodes connected in parallel and forward and reverse biased, respectively, and the corresponding output terminals of the diode circuits are connected together and to the input terminals of the high alarm circuit and the low alarm circuit, respectively.

6. A temperature control alarm system according to claim 1 wherein the plurality of temperature-measuring devices are responsive to temperature deviations in a corresponding plurality of furnaces.

7. A temperature control alarm system according to claim 1 wherein the plurality of temperature-measuring devices comprise a plurality of thermocouples.

* * * * *

PO-1050
(5/69)

UNITED STATES PATENT OFFICE
CERTIFICATE OF CORRECTION

Patent No. 3,636,540                  Dated January 18, 1972

Inventor(s)     Holton E. Harris

It is certified that error appears in the above-identified patent and that said Letters Patent are hereby corrected as shown below:

Column 2, line 18, "14" should be --$14\underline{n}$--;
         line 22, "14" should be --$14\underline{n}$--;
         line 32, "20" should be --$22\underline{n}$--;
         line 37, "14" should be --$14\underline{n}$--;
         line 52, "12" should be --$12\underline{n}$--;
         line 55, "10" should be --$10\underline{n}$--;
         line 56, "12" should be --$12\underline{n}$--;
         line 59, "30" should be --$30\underline{n}$--;
         line 66, "32" should be --$32\underline{n}$--;
         line 69, "34" should be --$34\underline{n}$--;
Column 3, line  7, "34" should be --$34\underline{n}$--;
         line 13, "10" should be --$10\underline{n}$--;
         line 41, "10" should be --$10\underline{n}$--;
         line 64, "30" should be --$30\underline{n}$--;
Column 4, line  2, "34" should be --$34\underline{n}$--.

Signed and sealed this 18th day of July 1972.

(SEAL)
Attest:

EDWARD M. FLETCHER, JR.
Attesting Officer

ROBERT GOTTSCHALK
Commissioner of Patents